United States Patent
Abraham et al.

(10) Patent No.: US 10,789,230 B2
(45) Date of Patent: Sep. 29, 2020

(54) MULTIDIMENSIONAL APPLICATION MONITORING VISUALIZATION AND SEARCH

(71) Applicant: Microsoft Technology Licensing, LLC, Redmond, WA (US)

(72) Inventors: Arun M. Abraham, Redmond, WA (US); Vu T. Tran, Renton, WA (US); Dimah S M Zaidalkilani, Kirkland, WA (US); John R. Gardner, Jr., Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 555 days.

(21) Appl. No.: 15/587,152

(22) Filed: May 4, 2017

(65) Prior Publication Data

US 2017/0337227 A1    Nov. 23, 2017

Related U.S. Application Data

(60) Provisional application No. 62/337,718, filed on May 17, 2016.

(51) Int. Cl.
| | | |
|---|---|---|
| *G06F 16/22* | (2019.01) | |
| *G06F 16/26* | (2019.01) | |
| *G06F 16/248* | (2019.01) | |
| *G06F 16/28* | (2019.01) | |
| *G06F 11/32* | (2006.01) | |

(Continued)

(52) U.S. Cl.
CPC ........ *G06F 16/2264* (2019.01); *G06F 3/0482* (2013.01); *G06F 11/323* (2013.01); *G06F 11/3476* (2013.01); *G06F 16/248* (2019.01); *G06F 16/26* (2019.01); *G06F 16/287*

(2019.01); *G06T 11/206* (2013.01); *G06F 11/3664* (2013.01); *H04L 41/22* (2013.01); *H04L 41/5067* (2013.01)

(58) Field of Classification Search
None
See application file for complete search history.

(56) References Cited

U.S. PATENT DOCUMENTS

| | | |
|---|---|---|
| 8,965,907 B2 | 2/2015 | Mital et al. |
| 9,026,862 B2 | 5/2015 | Dreyfoos et al. |

(Continued)

OTHER PUBLICATIONS

"International Search Report and Written Opinion Issued in PCT Application No. PCTUS2017/032918", dated Jul. 28, 2017, 11 Pages.

(Continued)

*Primary Examiner* — Uyen T Le
(74) *Attorney, Agent, or Firm* — Dicke, Billig & Czaja, PLLC

(57) ABSTRACT

Systems and processes that group and present telemetry data for an application monitoring visualization are described. A plurality of telemetry items having telemetry data is grouped into a type having a plurality of dimensions. The telemetry data is presented in a first set of values of a first dimension of the plurality of the dimensions against a measurement as elements in a primary section of the visualization. The telemetry data is presented in a second set of values of a second dimension of the plurality of the dimensions in counts as elements in a filter section of the visualization.

20 Claims, 5 Drawing Sheets

(51) Int. Cl.
*G06F 11/34* (2006.01)
*G06F 3/0482* (2013.01)
*G06T 11/20* (2006.01)
*G06F 11/36* (2006.01)
*H04L 12/24* (2006.01)

(56) References Cited

U.S. PATENT DOCUMENTS

| | | | |
|---|---|---|---|
| 9,313,560 B2 | 4/2016 | Bae et al. | |
| 9,590,880 B2 | 3/2017 | Ashby et al. | |
| 10,209,956 B2* | 2/2019 | Fletcher | G06F 3/04817 |
| 2004/0064293 A1 | 4/2004 | Hamilton et al. | |
| 2005/0188423 A1 | 8/2005 | Motsinger et al. | |
| 2010/0153374 A1* | 6/2010 | LeBlond | G06Q 10/06398 707/722 |
| 2011/0077958 A1* | 3/2011 | Breitenstein | G06Q 10/10 705/2 |
| 2011/0314400 A1 | 12/2011 | Mital et al. | |
| 2012/0054331 A1 | 3/2012 | Dagan | |
| 2013/0169644 A1 | 7/2013 | Bolton | |
| 2015/0294256 A1 | 10/2015 | Mahesh et al. | |
| 2016/0328522 A1* | 11/2016 | Howley | H04L 67/32 |
| 2017/0083572 A1* | 3/2017 | Tankersley | G06F 3/04847 |
| 2017/0109380 A1 | 4/2017 | Crawford et al. | |
| 2017/0123397 A1* | 5/2017 | Billi | G05B 15/02 |
| 2017/0123956 A1* | 5/2017 | Lindo | G06F 11/3612 |

OTHER PUBLICATIONS

Coriani, Silvano, "Windows Azure: Telemetry Basics and Troubleshooting", https://social.technet.microsoft.com/wiki/contents/articles/18146.windows-azure-telemetry-basics-and-troubleshooting.aspx, Published on: Jun. 28, 2013, 7 pages.

* cited by examiner

MULTIDIMENSIONAL APPLICATION MONITORING VISUALIZATION AND SEARCH

CROSS-REFERENCE TO RELATED APPLICATION

This application claims the benefit of the filing date of U.S. Provisional Patent Application No. 62/337,718, which is titled "MULTIDIMENSIONAL APPLICATION MONITORING VISUALIZATION AND SEARCH" filed on May 17, 2017, the disclosure of which is incorporated by reference in its entirety.

BACKGROUND

In order to improve the quality of software applications, software developers attempt to understand how the applications perform in the hands of users including customers and clients. While laboratory or development testing, such as debugging and logging, during application development is important in improving quality, laboratory testing alone is seldom sufficient for many modern applications. Modern software applications, especially web and mobile applications, are highly interactive, and a full range of user interactions is difficult to simulate in a laboratory or during development. Also, a number of environmental conditions effect user experience with applications. For example, network connectivity, GPS-signal quality, and device hardware all vary widely. Some platform APIs can even change behavior depending on the amount of power left in the device battery. These diverse environmental conditions are difficult to reproduce in a laboratory. Thus, many software developers endeavor to collect diagnostic and performance trace data from the field.

Developers who seek meaningful information regarding application performance in the field can employ analytics services, such as application monitoring services, or write custom logging and telemetry code to include a telemetry layer in the application. A telemetry layer can generate large amounts of analytical data, and popular applications can generate a large amount of diverse data from a vast set of users. Discovering trends in such large amounts of data can be cumbersome with traditional search techniques. For example, traditional searches do not develop meaningful and usable sets of telemetry items. Often, data sets are developed and repeatedly searched again with different criteria to create meaningful and usable sets of telemetry items that can inform a developer of key issues. Other times, key issues are lost in the large amount of data.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Systems and processes that group and present telemetry data as an application monitoring visualization for search and filtering are described. In one example, a plurality of telemetry items having telemetry data is grouped into a type having a plurality of dimensions. The telemetry data is presented in a first set of values of a first dimension of the plurality of dimensions against a measurement as elements in a primary section of a visualization. The telemetry data is also presented in a second set of values of a second dimension of the plurality of the dimensions in counts as elements in a filter section of the visualization. In one example, searches of telemetry items can be performed with an interactive visualization that displays telemetry as a pivotable time series histogram that allows multi-dimensional filtering. Users of the visualization are able to analyze trends in their telemetry data, and identify frequent issues or deviations from the normal with the visualization elements. Visualization elements can become the basis of a narrower search scope that allows users to get to a small enough set of telemetry instances that can be meaningfully analyzed.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
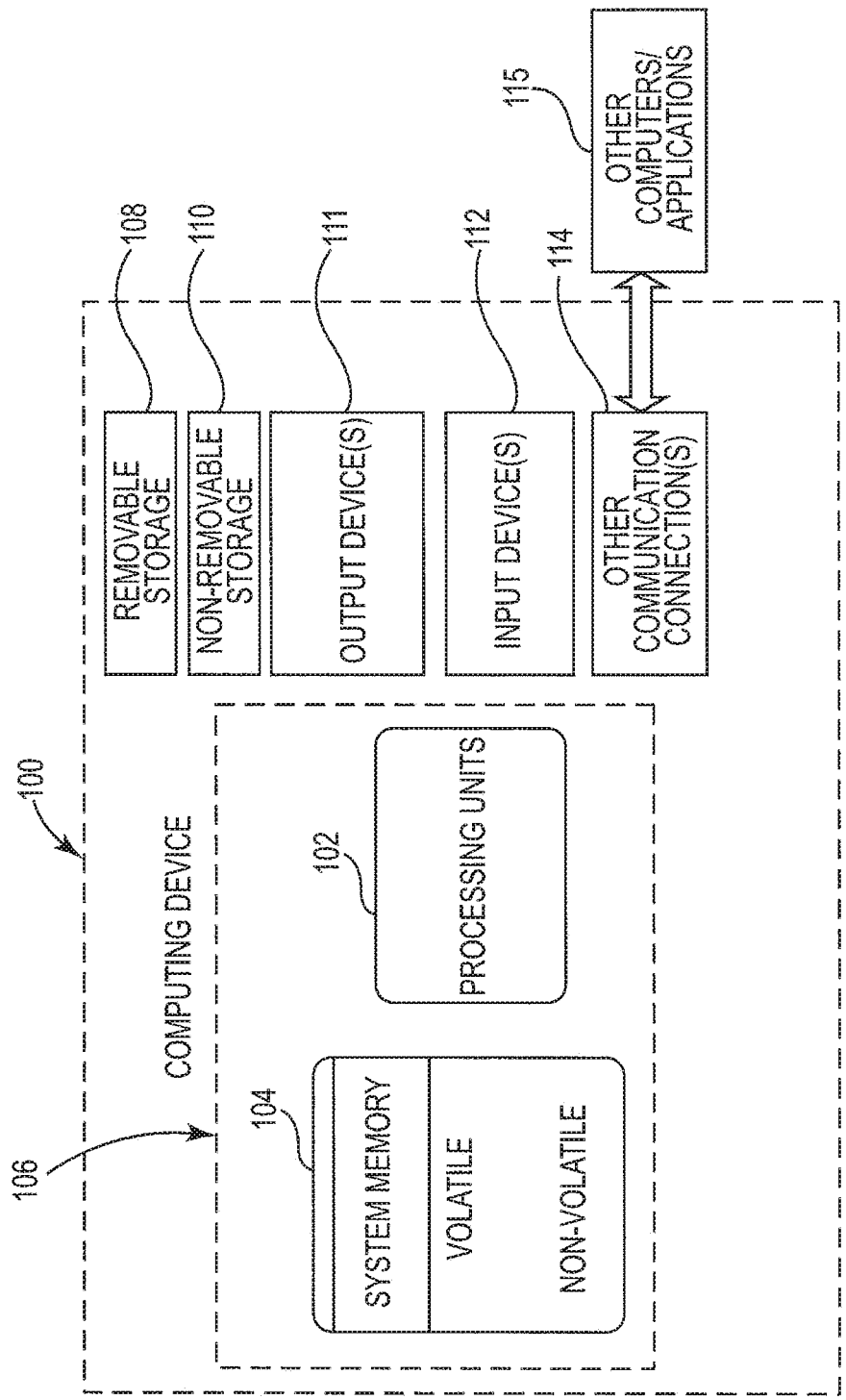
FIG. 1 is a block diagram illustrating an example of a computing device.

FIG. 1 illustrates an exemplary computer system that can be employed in an operating environment and used to host or run computer programming in the form of a computer application included on one or more computer readable storage mediums storing computer executable instructions for controlling the computer system, such as a computing device, to perform a process. A computing device can be implemented as various combinations of hardware and programming for controlling a system. An example of a computer-implemented process includes generation of visualizations and searches of telemetry data that can be collected and stored in a computer memory and processed with circuitry or a combination of circuitry and programming.

The exemplary computer system includes a computing device, such as computing device 100. In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network, computer cluster, cloud services infrastructure, or other.

Computing device 100 can also have additional features or functionality. For example, computing device 100 may also include additional storage. Such storage may be removable and/or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse), pen, voice input device, touch input device, or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface.

The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

Figure 2:
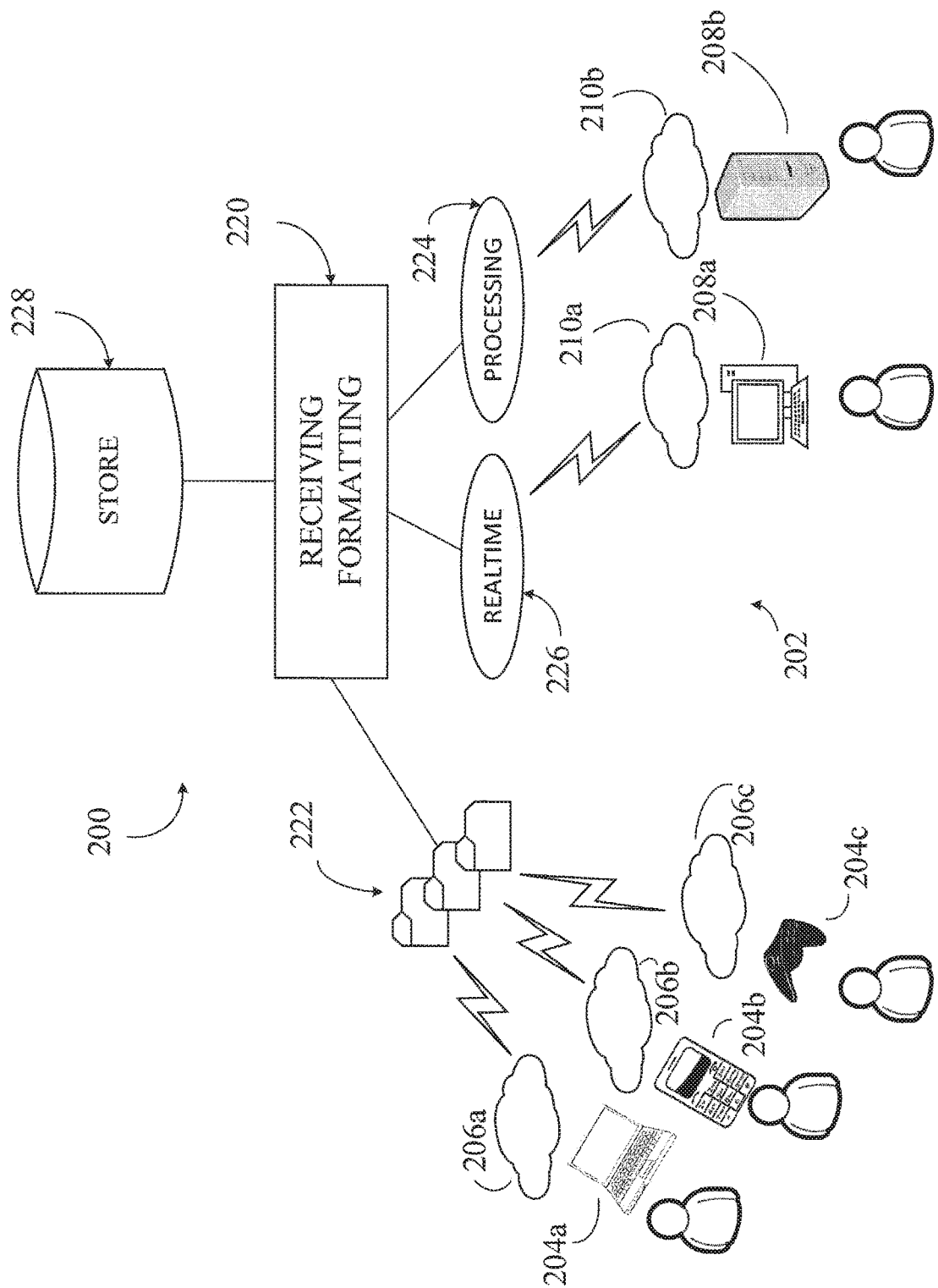
FIG. 2 is a block diagram illustrating an example telemetry system incorporating a computing device.

FIG. 2 illustrates an example telemetry system 200 that can include one or more computing devices, such as computing device 100, in a computer network 202. For illustration, the example telemetry system 200 can communicate with one or more client computing devices, e.g., client devices 204a-204c, executing instrumented software applications 206a-206c and can also communicate with one or more subscriber devices, e.g., subscriber computing devices 208a-208b, executing analytics software applications 210a-210b. In one example, the client devices 204a-204c and instrumented applications 206a-206c initiate communication with the telemetry system 200 over the network 202. In some applications, client devices include servers that remotely interact with web browsers. Instrumented applications 206 can include mobile applications, desktop applications, web applications or multi-tiered applications, distributed applications, and other applications. For example, an instrumented application can include all of a client, server, and other components. Client devices executing instrumented applications can include mobile device and other computing devices as well as servers, combinations of devices in cases such as distributed applications, and Internet of Things devices.

Instrumentation refers to augmenting an application with code that generates data that can be used to monitor or measure the performance and usage of the application, to diagnose errors, and to write trace information, and the like. Programmers implement instrumentation in the form of code instructions that monitor specific components in a system. When an application contains instrumentation code, it can be managed using a management tool to review the performance of the application.

In some examples, a developer can instrument an application with custom code and code annotations during development of the application. Instead of or in addition to writing custom code, programmers can choose to implement application-monitoring software, including cloud-based application-monitoring services, to automatically instrument an application via a monitoring agent in a software development kit or plugin that, for example, can rewrite application binaries to include instrumentation or create a telemetry layer. An application-monitoring program can be included in an integrated development environment, making it easier for developers to instrument their applications directly from within developing tools. In some examples, an application-monitoring program can also provide the ability for developers to create custom metrics and custom logging. An example of an integrated development environment including rich application-monitoring functions is available under the trade designation Visual Studio from Microsoft Corp. of Redmond, Wash.

Applications can be instrumented for logging and telemetry, and the instrumentation is typically oriented around the internal structure of the application during development and to collect data once the application is released to actual users. Logging is an option in cloud environments to discover issues as they occur and to include historical data that can be applied to analyze the issues as they develop over time or happen regularly or intermittently at different times. In one example, logging is preferable to remoting into a production server to discover information about the application, particularly if the application has scaled to multiple servers, including hundreds of servers, or if services are not aware of which servers are at issue. Further, tracing can introduce delays between the time when a problem is discovered and when useful data can be obtained. Remoting and tracing, however, are also options for discovering application information and may be incorporated into the examples of generating analytics.

Telemetry is automated remote measurement and data collection. For example, telemetry data can represent information not discoverable during application development such as which configurations customers prefer, how are customers using features in the application, what are the circumstances surrounding errors or crashes, and other information. Telemetry data can include anonymous software versioning information, resource usage, memory access, operating systems in use, and many other examples. Monitoring agents from application-monitoring software development kits can instrument applications in order to generate operational data that can help with troubleshooting and improve performance. Telemetry system 200 provides the tools to collect data and to condense the collected data into analytics, or human-decipherable reports. Differences between telemetry and logging are presented here for illustration only and not meant to further define or narrow the scope of the features of telemetry system or systems and processes that group telemetry data. For example, telemetry system 200 can treat logs/traces as priorities with support for measurements and dimensions.

In some examples, the user of the instrumented applications 206a-206c can determine which telemetry information to provide to a telemetry system 200. For example, the user can select to retain particular information locally, such as personal or sensitive information, and allow other information to be provided to the analytics software application. The user can choose to not upload such information as telemetry data, and the telemetry system 200 will not have access to personal or sensitive data.

Telemetry design leads to events, or actions the instrumentation will track, and applications are typically instrumented to track a series of distinct actions of or interactions with the application. Telemetry instrumentation is provided by event authors, such as application developers or component developers, and in some examples is imposed on event handlers. In one example, an application developer may wish to track several dozen events in an application. An event definition is a description of a specific event, and includes a list of fields set forth in a contract called a schema that can provide a system for declaring and populating structured data in the example. An event includes actual instantiation of a set of data described in the event definition, and this set of data is logged and transmitted to the telemetry system 200. An event is emitted in response to selected actions or interactions, and the data payload of the event describes attributes and semantics about the stimulus that triggered its creation, effects of the event, or both. An event author or monitoring agent creates the event definition and the instrumentation code to populate and transmit the event to the telemetry system 200.

In one example, a monitoring agent facilitates instrumenting each of the subset of application methods or modules selected for monitoring. In rewriting binaries, for example, the monitoring agent injects code into each method or module that is configured to capture and report one or more of metrics, statistics, indicators, or other information associated with the application. On invocation of the method, for example, the instrumented monitoring logic capture metrics specific to that logic and provides telemetry data to system 200. In some examples, metrics may be inferred or computed from telemetry data. For instance, transaction response time may be determined by summing the response times of monitored methods comprising a transaction.

Telemetry system 200 includes, for example, a receiving/formatting system 220, logging library 222, processing system 224, real-time system 226, and event store 228. Telemetry data sent by client devices 204a-204c is received at telemetry system 200, which can then forward events to subscriber devices 208a-208b with low latency. Subscribers, using analytics application 210a-210b, can declare filters to receive relevant data. Telemetry system 200 can be configured to declare and populate structured or unstructured data. In one example, receiving/formatting system 220 can be a web service that accepts events provided by client devices 204a-204c over the Internet. Logging library 222 uploads data to the receiving/formatting system 220. Receiving/forwarding system 220 can provide data to processing system 224 for rich analytics, batch processing, and reporting. Receiving/forwarding system 220 can also, or alternatively, provide data to real-time system 226 for real-time, or near real-time, indexing, querying, monitoring, and alerting. For example, real-time system 226 can include an operational deadline from event to system response that is greater than instantaneous. Event store 228 can provide reference information about events to the telemetry system 200.

An event can be ingested as a process in one or more computing devices 100 in telemetry system 200. In one example, an instrumented software application, such as applications 206a-206c, emits an application event format to the logging library 222 at 302. Logging library 222 can include a code library that can, for example, accept an event, serialize data for transport, and upload the event to the receiving/formatting system 220. Logging library 222 can include logging libraries for multiple platforms, such as a Java logging library for the Java platform, an Android logging library for the Android platform, as well as other telemetry clients.

Logging library 222 emits a client event format to receiving/formatting system 220. In one example, the different logging libraries dependent on platform can include a common file format to describe event definitions and a format for serialization. In one example, the format to describe event definitions can include a serialization framework for schematized data such as that available under the trade designation Bond from Microsoft, Inc. The file format for serialization of payload can include a data-interchange format such as JavaScript Object Notation, or JSON. Receiving/formatting system 220 emits an ingested event format. Ingested events can be formatted in JSON and provided to real-time systems or batch processing systems, for example, to allow analytical applications 210a-210b to query for data.

Analytical applications 210a-210n can include stand-alone products, cloud-based or subscription services, portals within the telemetry system 200, or features as part of an integrated development environment. Examples of analytical applications 210a-210n are available under the trade designation Application Insights from Microsoft, Corp. Analytics application 210a-210n can include features such as usage analysis, which can offer information on how users deploy an application and what features are often used or avoided, performance analysis, which can offer information related to exceptions, call stack information, dependencies, object allocation, and underlying infrastructure, and availability monitoring regarding deployment of web applications. In some examples, data from an analytical application can be exported to another analytical application, such as a more specialized or more powerful analytical application that can include a relational database system or business intelligence system.

Analytical application 210 can receive and catalog telemetry items for presentation in a visualization and other analytical tools. The received telemetry items can be categorized by sets and included in one or more subsets. In one example, received telemetry items can be sorted by type, which can include a preselected or user-defined overarching subject of interest to the developer. Depending on the instrumentation and interests of the user, an application may generate telemetry items of one or more types. Each type can be further categorized by one or more dimensions corresponding with that type, and each dimension can be categorized by one or more values corresponding with that dimension. Each value may include zero or more telemetry items corresponding with that value, which can depend on the telemetry generated through use of the application, and can be represented as counts. In one example, the value is not captured in the telemetry sent from the application. The instrumented application in this example captures the {type, dimension, key}—for instance, {Server Request, HTTP Status Code, 404} or {Exception, Exception Type, NullReferenceException}. The value representing the counts is typically aggregated globally by the telemetry system 200. For instance, Count of {Server Request, HTTP Status Code, 404}=10,000. In one example, types, dimensions, and values are predefined as part of the application-monitoring program, which can sort the telemetry items into types, dimensions, and values. In other examples, a developer can custom-define types, dimensions, and values.

For example, a telemetry type can include server response in a multi-tiered application, such as a web application hosted in ASP.NET or J2EE. The telemetry items related to server response can be further sorted into nonexclusive subsets of dimensions. Example dimensions of the server response can include (1) performance buckets, i.e., which performance range does the request fall under or into, (2) HTTP status code, such as codes 404, 500, 200, and others, (3) exceptions, (4) location analysis, (5) role instances, and other selected or user-defined dimensions.

Each telemetry item in the server response type can include aspects in one or more dimensions. For example, each telemetry item related to server response may include one or more of a time code indicating a time of day of the event, a server response time in milliseconds, an HTTP response code associated with the event, a problem identifier or exception type, geographic location information (such as state, province, country or other information), machine on which the request was executed, and other information.

Values in performance analysis on server requests can include <250 ms, 250-500 ms, 500-750 ms, 750-1000 ms, and >1 second, or other time ranges. The number of telemetry items of the server response type corresponding with each value can be represented by counts.

Values in the error analysis on server requests can include HTTP response codes 200, 206, 422, 500, or other codes. The number of telemetry items of errors in server requests corresponding with each HTTP response code can be represented by counts.

It is contemplated that not every telemetry item for a type will correspond with each dimension, e.g., not every telemetry item reporting a server response performance may result in an error. It is also contemplated that a telemetry item may correspond with more than one value for a dimension. For example, an error may correspond with more than one HTTP response code.

Other examples of telemetry types include exceptions, remote dependency, custom events, page views, traces and other types. Examples of dimensions of exceptions can include exception type, method, problem identifier, assembly, location, role instance, and others. Examples of dimensions for remote dependency include dependency name, dependency type, performance bucket, role instance, and others. Examples of dimensions of custom events include event name, role instance, location, and others. The examples below describe a visualization with respect to an example of server requests for illustration only, and visualizations can be configured to present information and searches on other telemetry types.

Figure 3:
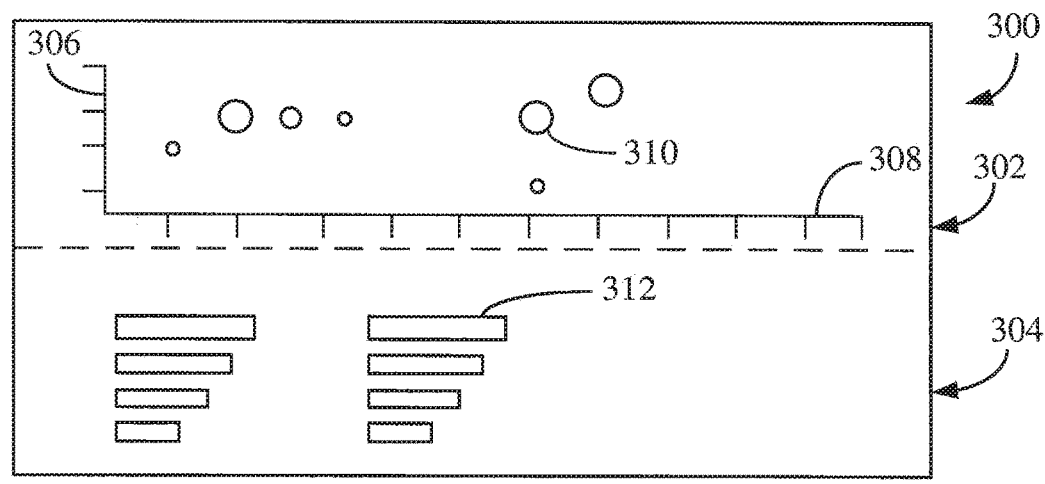
FIG. 3 is a block diagram illustrating an example visualization of a feature of the telemetry system of FIG. 2.

FIG. 3 illustrates an example visualization 300 of the multiple dimensions of the telemetry items for a given type. Visualization 300 includes primary section 302 and a filter section 304. The primary section 302 includes a multidimensional view (in the example a three (or more) dimensional view) of the counts for a selected dimension of the telemetry type. For example, the primary section 302 can include a time histogram having a Y-axis 306 indicating values in the selected dimension against a time period time on the X-axis 308. For example, the time period may include the last 24 hours or other selected time frame. The size or area of the circles 310 in the histogram represents the amount of items that are associated for the value of the dimension at that time. For example, the area of the circle 310 can represent counts per time period (from X-axis 308) per value (from Y-axis 306). Other examples are contemplated.

The filter section 304 includes another dimension, or in the case of a telemetry type having more than two dimensions, other dimensions of the telemetry type by values of each of the dimensions, and then an amount of items that are associated with that value. For example, the filter section 304 can include bar graphs. Each bar 312 can represent a value in the dimension and the length of the bar can represent the counts for that value. Other examples are contemplated.

Visualization 300 provides users with a high-density view of counts of telemetry items over time by each value in the primary section 302 and counts of telemetry items by values in other dimensions in the filter section 304. This allows users to quickly analyze the telemetry data for changes and trends across dimensions and values in a single visualization.

In some examples, the granularity and scope of the section elements can be user-adjusted. For example, the X-axis 308 on the histogram in section 302 can be adjusted to resolve into hours, 30 minutes, 15 minutes, or the like for the 24 hour range along the X-axis 308. Also, the time period can be adjusted to indicate other time ranges, such as the last 3 hours, a selected 24-hour period from last week, and other user-selected or relevant time periods of varying scope or granularity.

The Y-axis of section 302 can also be adjusted depending on the values of the dimension. For example, instead of generating circles 310 for every 250 milliseconds of server response, the user can adjust the Y-axis 306 values to generate circles 310 for every 100 milliseconds. Also, the Y-axis 306 values can be adjusted to display circles 310 for the 250-500 millisecond range resolved in 50 millisecond response values instead of over all server response times, or to display circles 310 for HTTP response code 200 and 500 instead of all response code values. Other examples of varying scope or granularity in the primary section 302 and filter section 304 are contemplated.

The example elements of the visualization 300 include bars of a bar graph, axes, values along the axes, other features of the histogram, labels, and other items. In other examples, elements can include pie charts, portions of a pie chart, graphs, and other indicia or labels of items in the visualization. The elements of the sections 302 and 304 can be selected to define searches for telemetry items. For example, a user can select one or more circles on the time histogram of the primary section 302 or one or more bars of the filter section 304 to search for corresponding telemetry items.

Figure 4:
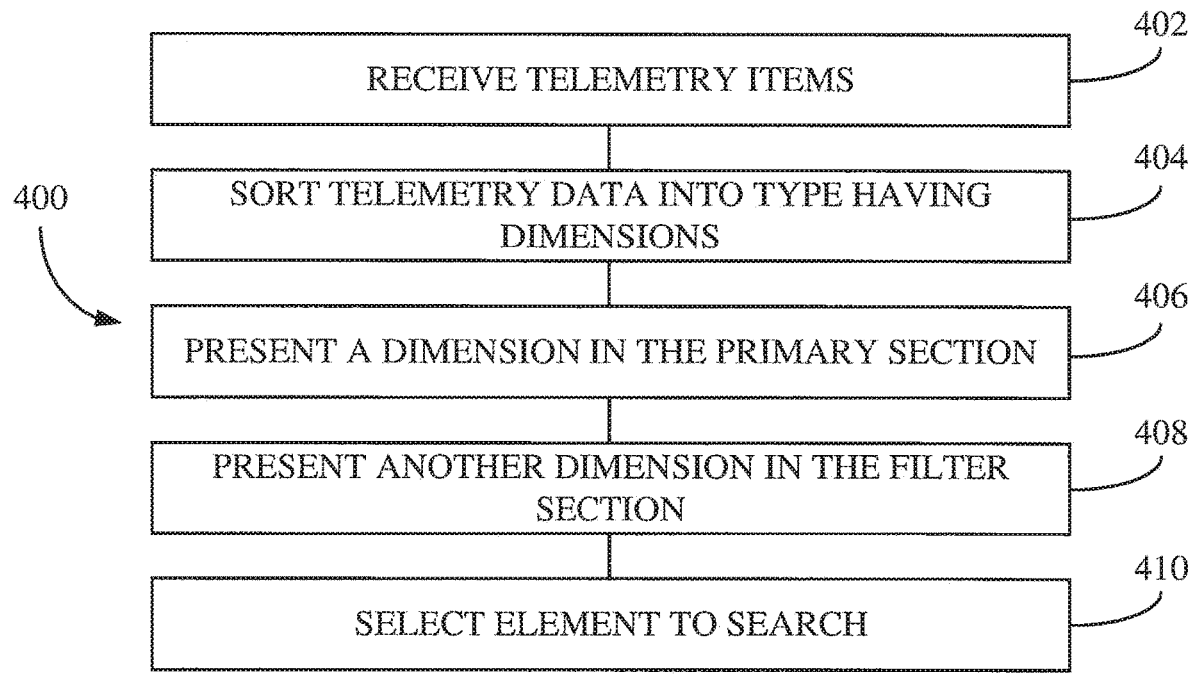
FIG. 4 is a block diagram illustrating an example process of the feature of the telemetry system of FIG. 2.

FIG. 4 illustrates an example method of presenting telemetry items in a visualization such as visualization 300. A plurality of telemetry items having telemetry data are received at 402. The telemetry data is grouped into a type having a plurality of dimensions at 404. Telemetry data is presented in a first set of values of one of the dimensions of the plurality of the dimensions against a course of time as elements in a primary section at 406. The telemetry data is presented in a second set of values in another of the dimensions of the plurality of the dimensions in counts as elements in a filter section at 408. Telemetry items are searched or appear in the visualization in response to selecting an element, or other gesture for example, at 410.

Telemetry items are received and grouped by telemetry type and dimensions of the type. From the telemetry items, metrics related to features of the instrumented application can be determined. In some examples, the telemetry items provide explicit indication of the metrics, and in other examples, the telemetry items can be processed to determine inferential metrics. In one example, the metrics can be provided as counts of telemetry items or inferential determinations of telemetry items and assigned to values within the dimensions. The visualizations of dimensions of a selected type are presented in the primary section and the filter selection. The dimensions are pivotable into the primary section, i.e., the user can select the dimension to present in the primary section. Selecting a visualization element can produce telemetry items corresponding with the visualization element. For example, a user can select a circle in the histogram of the primary section or a bar of the filter section to produce the telemetry items corresponding with the circle or bar. More than one visualization element can be selected to further refine the search.

Figure 5:
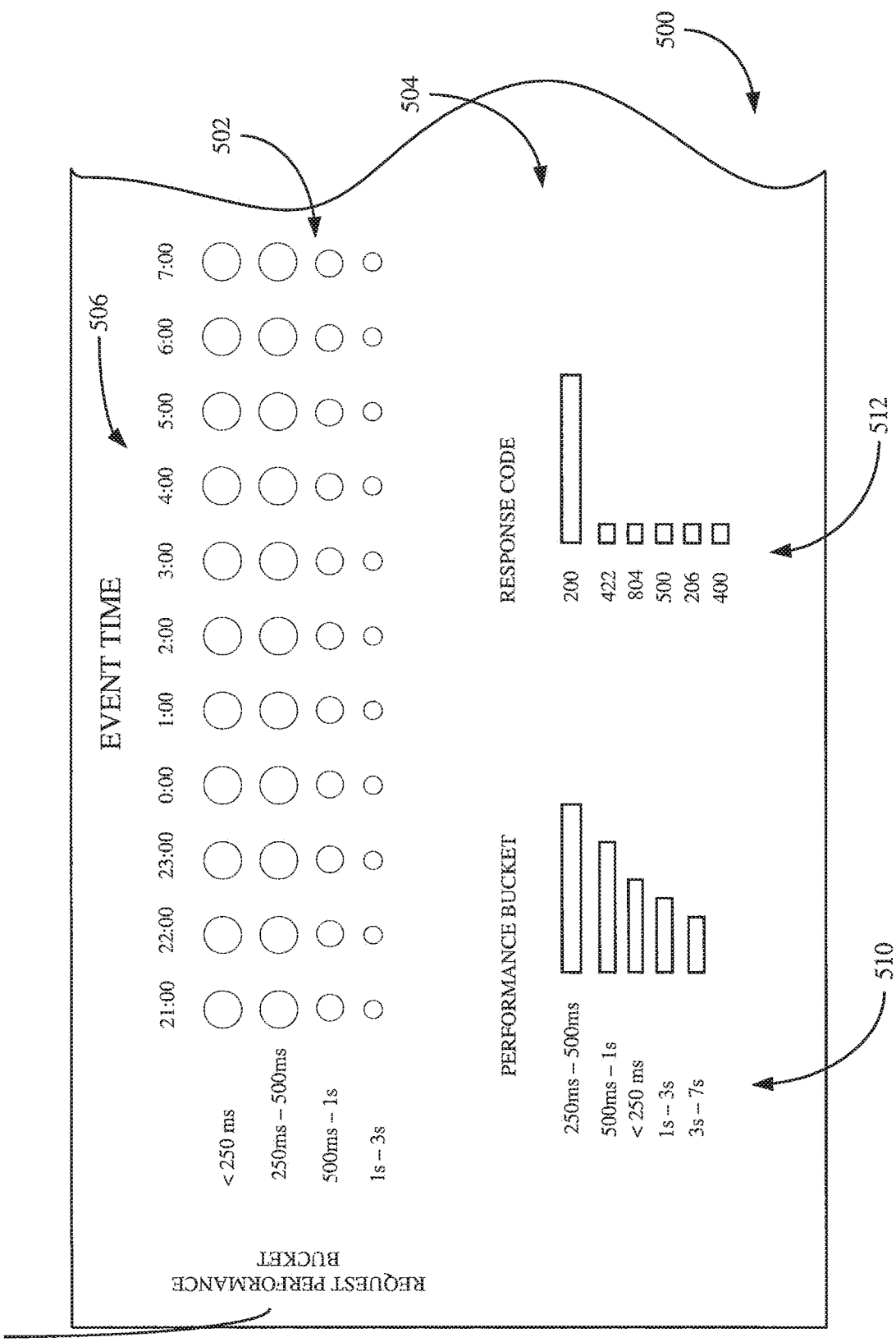
FIGS. 5 and 6 are screen-shots of examples of the visualization of FIG. 3.
Figure 6:
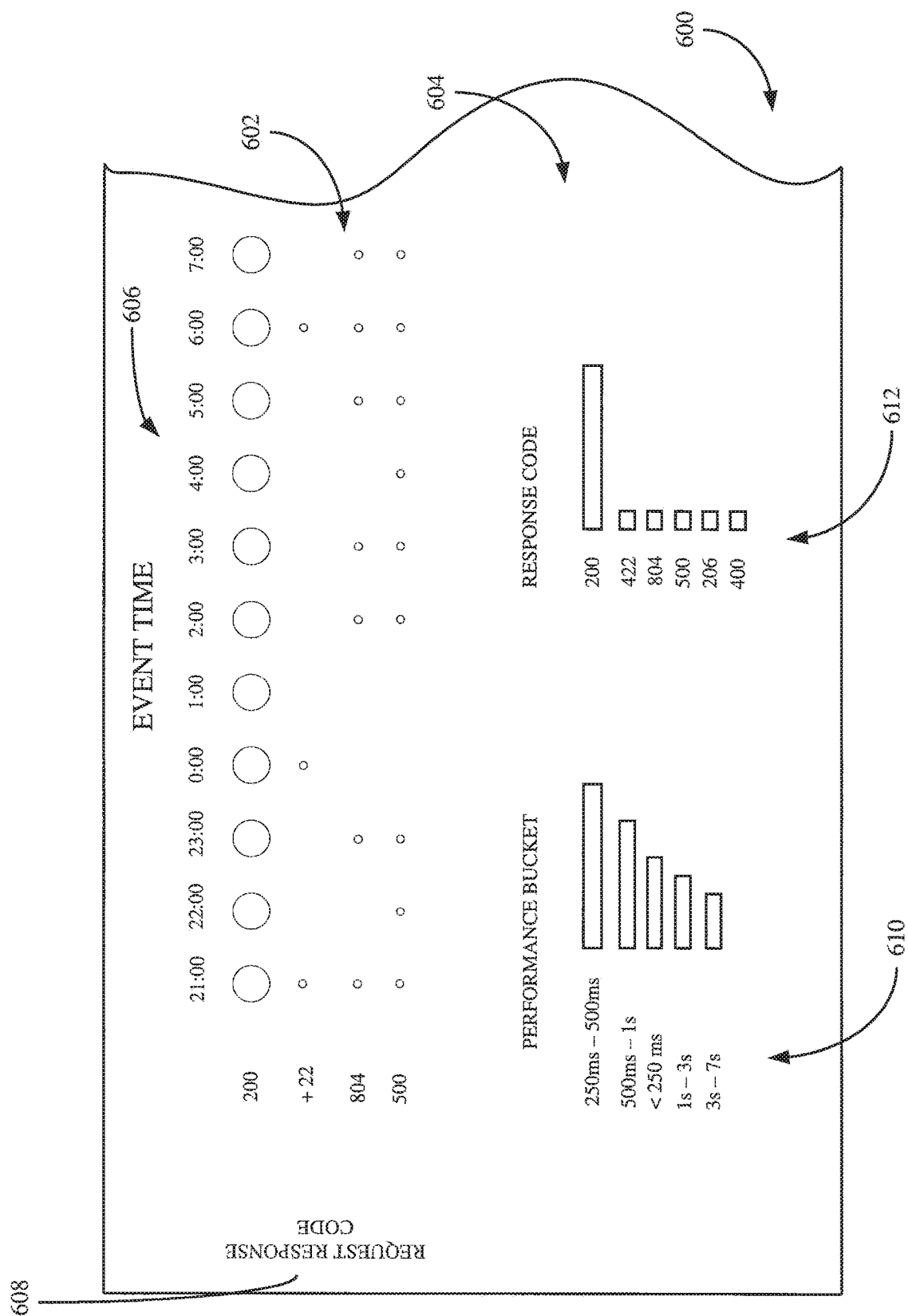

FIGS. 5 and 6 provide an illustrated example of the visualization and the search. The user can choose any dimension of the type as the dimension on the Y-axis in the histogram. The choice of dimension depends on the kind of analysis being performed. For instance, FIG. 5 illustrates an example visualization 500 having a primary section 502 and filter section 504. The primary section 502 includes performance analysis on requests as a function of time of day 506, and the y-axis values are server response time performance buckets 508. Performance buckets can be represented as a bar graph 510 in the filter section 504. Additionally, response codes can be represented as a bar graph 512 in filter section 504. A user can pivot the dimension to present error analysis on server requests as the y-axis become HTTP response codes in FIG. 6.

FIG. 6 illustrates an example visualization 600 having a primary section 602 and a filter section 604. The primary section 602 includes response codes as a function of time of day 606 in which the y-axis values are response codes 608. The performance analysis on requests dimension become or remain part of the filter section 604, and counts in the server response time values become bars of a bar graph 610. Additionally, response codes can remain represented as a bar graph 612 in filter section 604.

Selecting an element in the primary section can refine the filter section. For example, the circle of the histogram of a given server response time at a given time can be selected and highlighted. If, for instance, the server response time is 500 milliseconds to 1 second at 7:00 is selected, telemetry items at the 7:00 time having a server response of 500 milliseconds to 1 second will be displayed.

Additionally, selecting an element in the filter section can refine the primary section. For example, the HTTP response code 500 from the error analysis on server requests bar graph can be selected and highlighted to show telemetry items of corresponding server response times in the histogram.

A scope of telemetry metrics and a search can be narrowed by (1) selecting a circle on the time series histogram chart to limit time range and the y-axis dimension value (e.g. Performance Bucket=250 ms to 500 ms), (2) selecting one or more of the values of dimensions from the segment bar charts below to limit search to just those values of the dimensions (Response Code: 400 in the example), or (3) selecting a combination of the elements of the two. A search of telemetry items can be invoked using the scope set in the time series histogram. In the case of this implementation, a pointing device can be used to place a cursor on the circle and then to double click the circle to search the corresponding on telemetry items. For instance, this is the search query on double clicking on the green circle in chart above (combo case), can produce the telemetry items for the developer to review.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of application monitoring performed by a computer system, comprising:
   receiving a plurality of telemetry items having telemetry data;
   sorting, with the computer system, the telemetry items via the telemetry data into a first dimension and a second dimension of an overarching set of a type of a plurality of types, each type of the plurality of types having a plurality of subset dimensions of the type;
   determining with the computer system a plurality of values for the telemetry items in the first dimension and the second dimension, each of the telemetry items corresponding to a value of the dimension of the plurality of dimensions of the type of the plurality of types, the values corresponding with a selected metric determined from the telemetry item of the corresponding dimension;
   generating a visualization with the computer system, the visualization having a primary section simultaneously presented with a filter section;
   presenting the telemetry data in a first set of values of a first dimension of the plurality of the dimensions against a measurement via a first selected metric associated with the first dimension as elements in the primary section of the visualization; and presenting the telemetry data in a second set of values of a second dimension of the plurality of the dimensions in counts of numbers of telemetry items in the second dimension via a second selected metric associated with the second dimension as elements in the filter section of the visualization.

2. The method of claim 1 including interactively pivoting the first set of values to the filter section and the second set of values to the primary section.

3. The method of claim 1 wherein grouping includes grouping the telemetry items into a plurality of types each having a plurality of dimensions.

4. The method of claim 3 wherein the plurality of types include a user-defined overarching subject of interest.

5. The method of 1 wherein each dimension of the plurality of dimensions includes one or more values.

6. The method of claim 5 wherein each value includes zero or more of the telemetry items.

7. The method of claim 1 wherein the primary section includes a multidimensional view of values of the first set of values.

8. The method of claim 7 wherein the multidimensional view is a time histogram indicating values in a selected dimension against a time period.

9. The method of claim 8 wherein the filter section includes a bar graph having a plurality of bars indicating counts corresponding with a plurality of values of the second set of values.

10. The method of claim 8 wherein the period of time can be adjusted to indicate a selected range of time.

11. The method of claim 1 including selecting a selected value from the first set of values to produce the telemetry items corresponding with the selected value.

12. A system to monitor an application, comprising:
memory to store a set of instructions; and
a processor to execute the set of instructions to:
receive a plurality of telemetry items having telemetry data;
sort, with the computer system, the telemetry items via the telemetry data into a first dimension and a second dimension of an overarching set of a type of a plurality of types, each type of the plurality of types having a plurality of subset dimensions of the type including a first dimension and a second dimension, the first dimension having a first set of values and the second dimension having a second set of values;
determine with the computer system a plurality of values for each of the telemetry items in the first dimension and the second dimension, each of the telemetry items corresponding to a value of the dimension of the plurality of dimensions of the type of the plurality of types, the values corresponding with a selected metric determined from the telemetry item of the corresponding dimension;
generate a visualization with the computer system, the visualization having a primary section simultaneously presented with a filter section;
present the telemetry data in the first set of values against a measurement via a first selected metric associated with the first dimension as elements in the primary section of the visualization; and
present the telemetry data in the second set of values in counts of numbers of telemetry items in the second dimension via a second selected metric associated with the second dimension as elements in the filter section of the visualization.

13. The system of claim 12 wherein the first set of values can selectively pivot to the filter section and the second set of values can selectively pivot to the primary section.

14. The system of claim 12 wherein the elements in the filter section include bars of a bar graph.

15. The system of claim 12 wherein the measurement includes a selected period of time.

16. The system of claim 12 wherein the elements of the primary section include performance buckets.

17. The system of claim 12 wherein elements are selectable to produce the telemetry items corresponding with each element.

18. A computer readable storage device to store computer executable instructions to control a processor to:
receive a plurality of telemetry items having telemetry data;
sort, with the computer system, the telemetry items via the telemetry data into a first dimension and a second dimension of an overarching set of a type of a plurality of types, each type of the plurality of types having a plurality of dimensions of the type;
determine with the computer system a plurality of values for each of the telemetry items in the first dimension and the second dimension, each of the telemetry items corresponding to a value of the dimension of the plurality of dimensions of the type of the plurality of types, the values corresponding with a selected metric determined from the telemetry item of the corresponding dimension;
generate a visualization with the computer system, the visualization having a primary section simultaneously presented with a filter section;
present the telemetry data in a first set of values of a first dimension of the plurality of the dimensions against a measurement via a first selected metric associated with the first dimension as elements in the primary section of the visualization; and
present the telemetry data in a second set of values of a second dimension of the plurality of the dimensions in counts of numbers of telemetry items in the second dimension via a second selected metric associated with the second dimension as elements in the filter section of the visualization.

19. The computer readable storage device of claim 18 wherein the first set of values are pivotable to elements of the filter section and the second set of values are pivotable to elements of the primary section.

20. The computer readable storage device of the claim 18, the computer executable instructions to control the processor to:
develop a search context of the telemetry items in response to selection of one or more sets of values.

* * * * *